US006895037B2

(12) United States Patent
Garodnick (10) Patent No.: US 6,895,037 B2
(45) Date of Patent: *May 17, 2005

(54) VARIABLE THROUGHPUT REDUCTION SPREAD-SPECTRUM COMMUNICATIONS

(75) Inventor: Joseph Garodnick, Centerville, MA (US)

(73) Assignee: Linez Linex Technologies, Inc., West Long Branch, NJ (US)

( * ) Notice: Subject to any disclaimer, the term of this patent is extended or adjusted under 35 U.S.C. 154(b) by 381 days.

This patent is subject to a terminal disclaimer.

(21) Appl. No.: 09/946,841

(22) Filed: Sep. 6, 2001

(65) Prior Publication Data

US 2002/0048313 A1 Apr. 25, 2002

Related U.S. Application Data

(63) Continuation of application No. 09/594,440, filed on Jun. 14, 2000, now Pat. No. 6,289,039.

(51) Int. Cl.[7] ............................................. H04B 1/707
(52) U.S. Cl. ...................................................... 375/143
(58) Field of Search ........................ 375/140, 141–144, 375/148, 150–153; 370/320, 335, 342, 441

(56) References Cited

U.S. PATENT DOCUMENTS

| 5,579,304 A | 11/1996 | Sugimoto et al. |
| 5,673,286 A | 9/1997 | Lomp |
| 5,926,500 A | 7/1999 | Odenwalder |
| 6,075,809 A | 6/2000 | Naruse |
| 6,192,066 B1 | 2/2001 | Asanuma |
| 6,289,039 B1 * | 9/2001 | Garodnick .................. 375/143 |

* cited by examiner

*Primary Examiner*—Don N. Vo
(74) *Attorney, Agent, or Firm*—David Newman Chrtd.

(57) ABSTRACT

A spread-spectrum system having a transmitted data rate determined by an error rate syndrome at a spread-spectrum receiver. Data are demultiplexed into a plurality of data channels, and spread-spectrum processed as a plurality of spread-spectrum channels. A combiner combines the plurality of spread-spectrum channels as a code-division-multiplexed signal. At a receiver, the code-division-multiplexed signal is despread into a plurality of despread channels. A multiplicity of adders, which is electronically controlled by an adder-control signal, adds several of the despread channels to generate a multiplicity of added channels. A syndrome signal is generated from an error rate of the multiplicity of added channels. From the syndrome signal, a desired-data rate is determined for the spread-spectrum transmitter.

20 Claims, 7 Drawing Sheets

VARIABLE THROUGHPUT REDUCTION SPREAD-SPECTRUM COMMUNICATIONS

RELATED PATENTS

This patent stems from a continuation application of U.S. patent application Ser. No. 09/594,440, and filing date of Jun. 14, 2000, entitled SPREAD-SPECTRUM COMMUNICATIONS UTILIZING VARIABLE THROUGHPUT REDUCTION by inventor, JOSEPH GARODNICK, which issued on Sep. 11, 2001, as U.S. Pat. No. 6,289,039. The benefit of the earlier filing date of the parent patent application is claimed for common subject matter pursuant to 35 U.S.C. § 120.

BACKGROUND OF THE INVENTION

This invention relates to spread-spectrum communications, and more particularly to spread-spectrum communications using parallel channels, preferably employing orthogonal chip-sequence signals, with error rate and data rate feedback.

DESCRIPTION OF THE RELEVANT ART

In a packet-communications spread-spectrum multi-cell system, high-speed data can be implemented with the prior art method of parallel channels, using parallel chip-sequence signals. By using multiple correlators or matched filters, multiple-orthogonal chip-sequence signals can be sent simultaneously thereby increasing the data rate while still enjoying the advantage of a high processing gain. The multiple chip-sequence signals behave as multiple users in a single location. Multipath is ameliorated by a RAKE receiver, and the interference to be overcome by the processing gain is that generated by other users, in the same or adjacent cells. When such interference occurs, it is called a collision.

Figure 1:
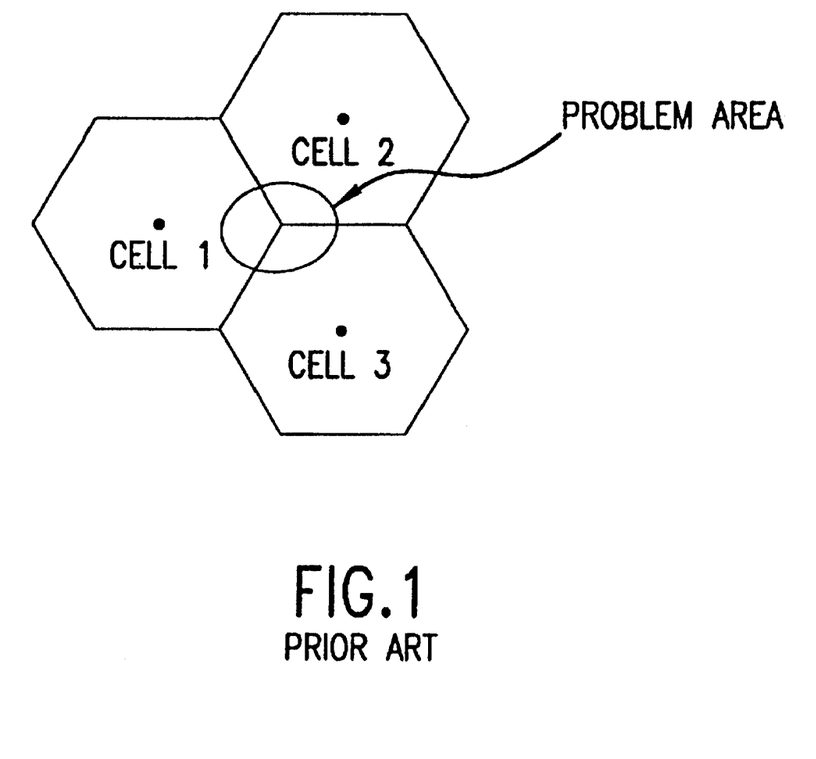
FIG. 1 illustrates a cellular architecture depicting a problem area from a remote station near a boundary.

Normally, when a remote station is within a cell or cell sector, as illustrated in FIG. 1, the path differences from base stations located in the adjacent cells ensure that the interference is small enough so as not to cause the error rate of the wanted signal to deteriorate below a usable level. When the remote station is near the edge of the cell, however, the interference can be substantial as the interference can result from two adjacent cells.

One method that has been used to overcome this problem in a conventional spread-spectrum system is to increase the processing gain in order to increase the immunity from interference. To do this, in a fixed bandwidth system, the data rate is reduced, and the integration time of the correlator or the length of the matched filter is increased accordingly. This method, however, changes the length of the correlator sequence, or changes the size of the matched filter; both of which impact the architecture of the receiver. In addition, with increased integration times, the chip-tracking loop and phase-tracking loop have to function flawlessly and the allowable frequency offset must be reduced, requiring at least a frequency locked loop.

Another method in the prior art is to repeat the symbols sequentially and add the result of the individually received symbols. This method changes the timing of the receiver and the framing of the data at the transmitter.

SUMMARY OF THE INVENTION

A general object of the invention is to vary the throughput of a transmitted spread-spectrum signal.

Another object of the invention is to set the throughput of a transmitted spread-spectrum signal based on a required error rate at a spread-spectrum receiver.

An additional object of the invention is to control a data rate of a spread-spectrum transmitter from a spread-spectrum receiver, using a closed loop method.

According to the present invention, as embodied and broadly described herein, a spread-spectrum system is provided comprising, at a spread-spectrum transmitter, a demultiplexer, a plurality of forward-error-correction (FEC) encoders and interleavers, a plurality of spread-spectrum processors, a combiner, and a modulator. At a spread-spectrum receiver, the system comprises a demodulator, a plurality of spread-spectrum despreaders, a multiplicity of adders, a multiplicity of FEC decoders and de-interleavers, a command processor, and a multiplexer.

The demultiplexer demultiplexes input data into a plurality of data channels. The plurality of forward-error-correction encoders and interleavers FEC encodes and interleaves the plurality of data channels, as a plurality of FEC encoded and interleaved channels, respectively.

The plurality of spread-spectrum processors spread-spectrum processes the plurality of FEC encoded and interleaved channels as a plurality of spread-spectrum channels. The plurality of spread-spectrum channels uses a plurality of chip-sequence signals to define a particular spread-spectrum channel. Preferably, the plurality of chip-sequence signals is a plurality of orthogonal chip-sequence signals, however, a plurality of quasi-orthogonal chip-sequence signals may be used.

The combiner combines the plurality of spread-spectrum channels as a code-division-multiplexed signal. The modulator transmits the code-division-multiplexed signal with the plurality of spread-spectrum channels, over a communications channel.

At the receiver, the demodulator translates the code-division-multiplexed signal to a processing frequency, and the plurality of spread-spectrum despreaders despreads the code-division-multiplexed signal into a plurality of despread channels, respectively.

The multiplicity of adders is electronically controlled by an adder-control signal. The multiplicity of adders adds at least two despread channels to generate a multiplicity of added channels.

The multiplicity of FEC decoder and de-interleavers generates a syndrome signal from an error rate of the multiplicity of added channels. The multiplicity of FEC decoders and de-interleavers, FEC decodes and de-interleaves the multiplicity of added channels, as a multiplicity of decoded channels.

In response to the syndrome signal, the command processor determines a desired-data rate, and generates a data-rate command signal having the desired data rate for the spread-spectrum transmitter. The command processor also generates the adder-control signal for adding together a number of despread channels of the plurality of despread channels, and generates a multiplexer signal having a number of decoded channels to multiplex together. The multiplexer multiplexes the multiplicity of decoded channels to generate an estimate of the input data.

The data-rate command signal is sent to the spread-spectrum transmitter. The data-rate command signal controls into how many data channels the demultiplexer demultiplexes the input data. Assume the demultiplexer, by way of example, demultiplexes input data into 16 parallel channels. If the processor in the receiver determines, as a response to the syndrome, that the input data are to be sent at twice the power of a single data channel of the plurality of data channels, then pairs of data channels in the plurality of data channels have identical data, with a resulting eight sets of data having different data per set. Each set of data comprises two data channels with identical data.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

The present invention employs a command processor with a parallel spread-spectrum system, for determining from an error rate, a desired-data rate. In a preferred embodiment, the desired-data rate meets an error rate criterion, such as fewer errors than a desired error rate. The error rate is from a syndrome, generated in a forward-error-correction decoder.

A spread-spectrum signal, as used herein, typically includes a data signal, multiplied by a chip-sequence signal, and multiplied by a carrier signal. The data signal represents sequence of data bits. The chip-sequence signal represents a sequence of chips, as normally used in a direct sequence, spread-spectrum signal. The carrier signal is at a carrier frequency, and raises the product of the data signal and the chip-sequence signal, to the carrier frequency.

For synchronization, the data signal typically is a constant value, for example, a series of one bits, or some sequence known a priori, or has very slowly time-varying data. The spread-spectrum signal may be a packet, with a header followed by data, or a plurality of spread-spectrum channels, with one of the spread-spectrum channels used for synchronization. A particular spread-spectrum channel is defined by a particular chip-sequence signal, as is well known in the art. For the case of the packet, synchronization is performed on the header, as is well-known in the art. For a dedicated spread-spectrum channel, synchronization is performed from the dedicated channel.

At a spread-spectrum transmitter, the spread-spectrum system includes demultiplexer means, encoder means, spreader means, combiner means, and modulator means. The encoder means in coupled between the demultiplexer means and the spreader means, and the combiner means is coupled between the spreader means and the modulator means. The input data enters the demultiplexer means.

The demultiplexer means demultiplexes input data into a plurality of data channels. The encoder means FEC encodes and interleaves the plurality of data channels as a plurality of FEC encoded and interleaved channels, respectively. The spreader means spread-spectrum processes the plurality of FEC encoded and interleaved channels as a plurality of spread-spectrum channels. The plurality of spread-spectrum channels has a plurality of chip-sequence signals, respectively. A particular chip-sequence signal defines a particular spread-spectrum channel, as is well-known in the art.

The combiner means combines the plurality of spread-spectrum channels as a spread-spectrum signal. The modulator means transmits the spread-spectrum signal having the plurality of spread-spectrum channels, over a communications channel. A spread-spectrum signal is transmitted over a communications channel by the modulator means.

At a spread-spectrum receiver, the system includes demodulator means, despreader means, adder means, decoder means, command means, and multiplexer means. The despreader means is coupled between the demodulator means and the adder means. The decoder means is coupled between the adder means and the multiplexer means. The command means is coupled to the adder means, decoder means and demultiplexer means. The command means further provides data to a communications link to the spread-spectrum transmitter, and to the demultiplexer means.

The demodulator means translates the code-division-multiplexed signal to a processing frequency. The despreader means despreads the code-division-multiplexed signal into a plurality of despread channels, respectively.

The adder means electronically is controlled by an adder-control signal. The adder means adds none or at least two despread channels to generate a multiplicity of added channels. The decoder means generates a syndrome signal from an error rate of the multiplicity of added channels. The decoder means also FEC decodes and de-interleaves the multiplicity of added channels, and a multiplicity of decoded channels.

In response to the syndrome signal, the command means determines a desired-data rate, and generates a data-rate command signal having the desired data rate. The command means also generates the adder-control signal for controlling the adder means, for adding together a number of despread channels of the plurality of despread channels. The command means generates a multiplexer signal for controlling the multiplexer means. The multiplexer means has a number of decoded channels to multiplex together.

The data-rate command signal is sent to the spread-spectrum transmitter. The data-rate command signal controls the demultiplexer means. The data-rate command signal determines the number of data channels into which input data are demultiplexed. Assume the demultiplexer means can demultiplex input data into a maximum of M data channels, where M is the number of data channels. If the processor means determined from the syndrome, that twice the power were required from the transmitter to maintain or reduce an error rate, then the data-rate command signal controls the multiplexer means to send the input data as two identical sets of M/2 data channels. In general, if the processor means determines from the syndrome, that N times the power is required, then the data-rate command signal controls the multiplexer means to send the input data as N identical sets of M/2 data channels.

The multiplexer means multiplexes the multiplicity of decoded channels and generates an estimate of the input data.

Figure 2:
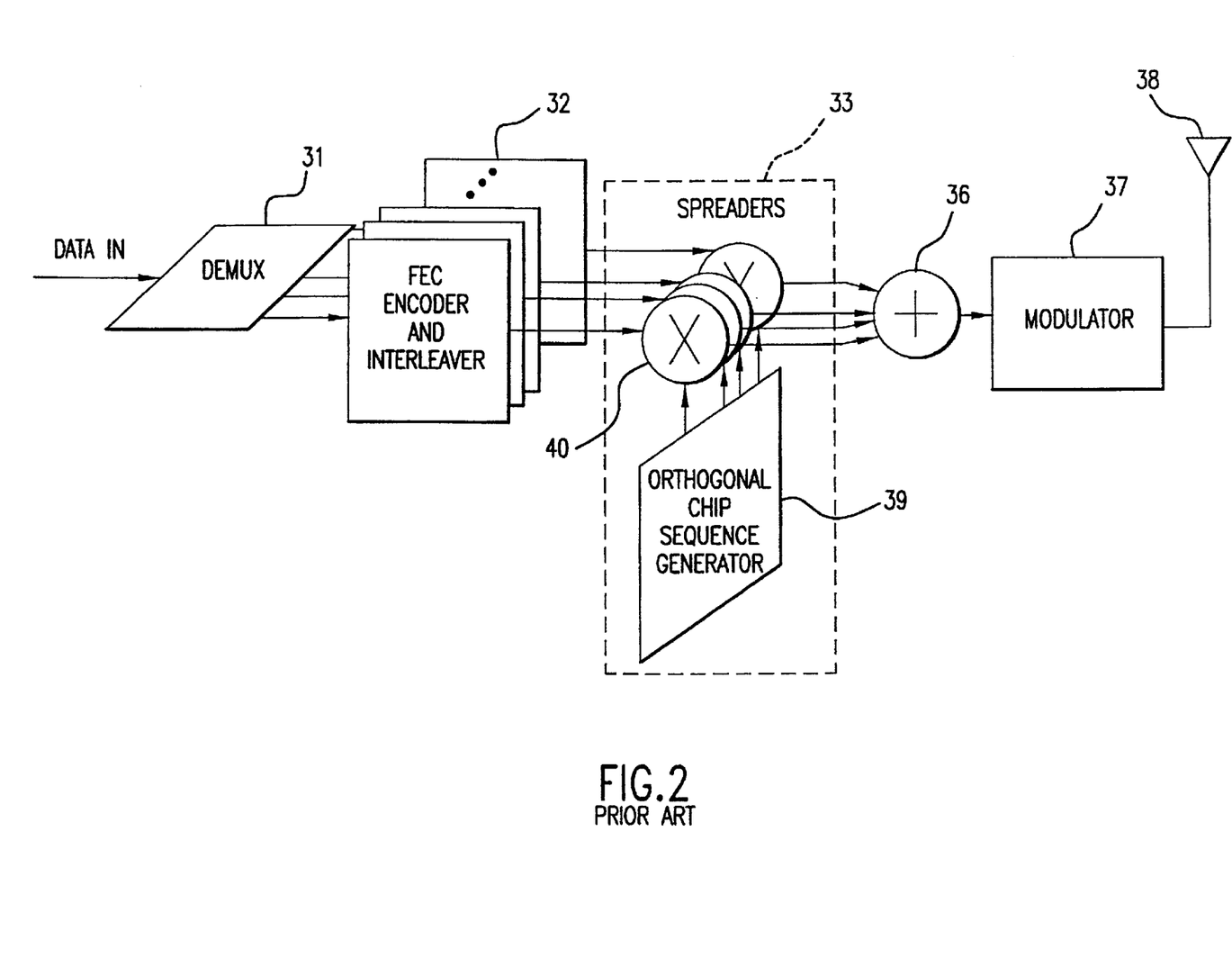
FIG. 2 is a block diagram of a spread-spectrum transmitter using/parallel channels.

As illustratively shown in FIG. 2, the demultiplexer means is embodied as a demultiplexer 31, the encoder means in embodied as a plurality of FEC encoders and interleavers 32, and the spreader means is embodied as a plurality of spreaders 33. The combiner means is embodied as a combiner 36, and the modulator means is embodied as a modulator 37. A transmitter antenna is coupled to the modulator 37.

The demultiplexer receives input data. The plurality of FEC encoders and interleavers 32 is coupled between the plurality of outputs from the demultiplexer 31, and the plurality of spreaders 33. The combiner 36 is coupled between the plurality of spreaders 33 and the modulator 37. The plurality of spreaders 33 may include a chip-sequence generator 39 for generating the plurality of orthogonal chip-sequence signals or a plurality of quasi-orthogonal chip-sequence signals, and a plurality of product devices 40, coupled to the chip-sequence generator 39. The plurality of product devices 40 spread-spectrum processes the plurality of encoded channels as the plurality of spread-spectrum channels. The plurality of spreaders, as is well-known in the art, alternatively may be embodied as a plurality of matched filters having a plurality of impulse responses matched to the plurality of chip-sequence signals, or a memory device for storing the plurality of chip-sequence signals.

The demultiplexer 31 demultiplexes input data into a plurality of data channels. The plurality of forward-error-correction encoders and interleavers 32, FEC encode and interleave the plurality of data channels as a plurality of FEC encoded and interleaved channels, respectively. The plurality of spreaders 33 spread-spectrum processes the plurality of FEC encoded and interleaved channels with as a plurality of spread-spectrum channels. The plurality of spread-spectrum channels is defined by a plurality of chip-sequence signals, as is well-known in the art.

The combiner 36 combines the plurality of spread-spectrum channels as a code-division-multiplexed signal, and the modulator 37 transmits, through the transmitter antenna 38, the code-division-multiplexed signal with the plurality of spread-spectrum channels, over a communications channel.

Figure 3:
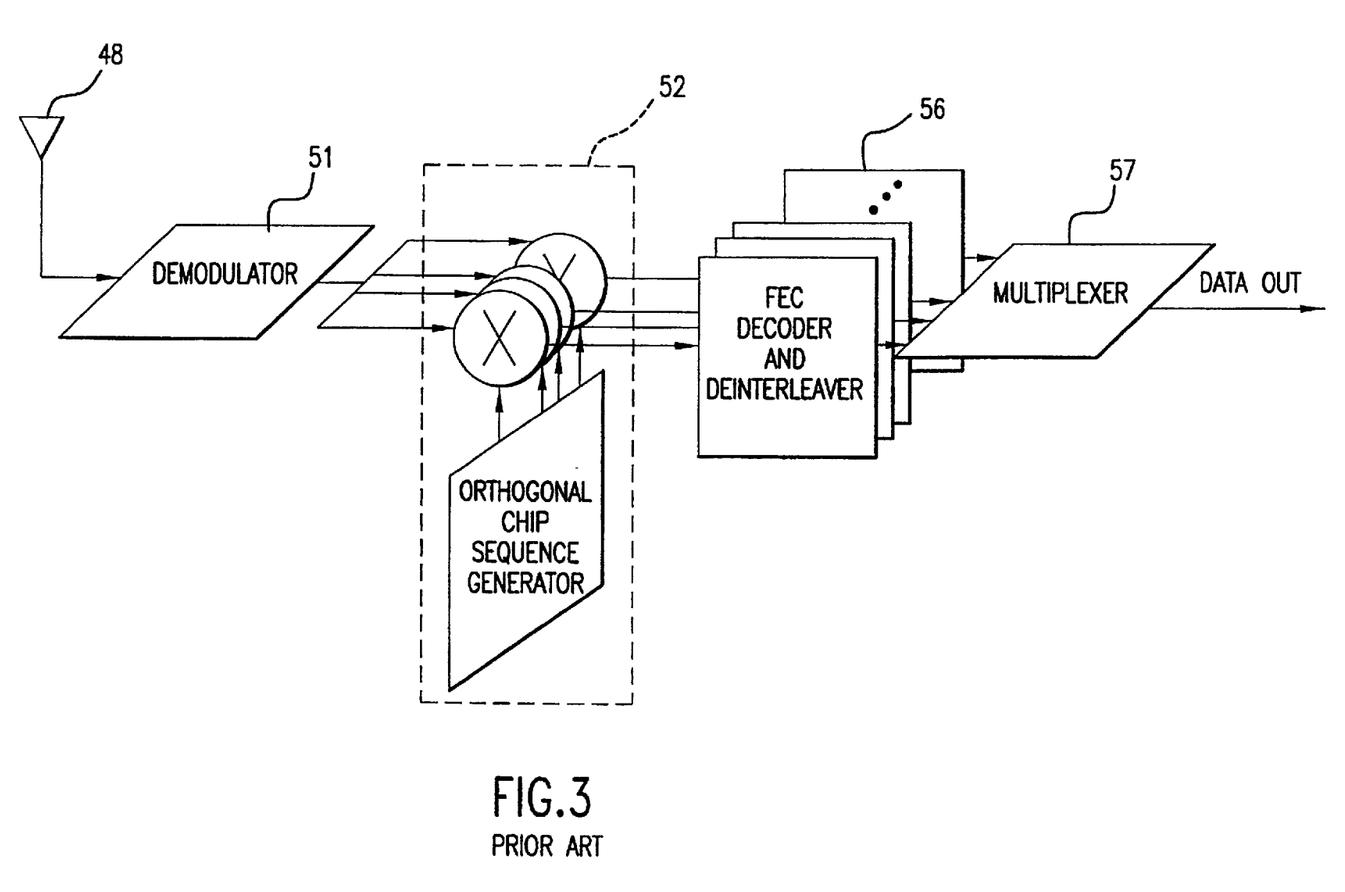
FIG. 3 is a block diagram of a spread-spectrum receiver for receiving parallel channels.

In the exemplary arrangement shown in FIG. 3, the demodulator means is embodied as a demodulator 51, and the despreader means is embodied as a plurality of despreaders 52. The adder means is embodied as a multiplicity of adders 53. The decoder means is embodied as a plurality of FEC decoders and de-interleavers 56, and the demultiplexer means is embodied as a demultiplexer 31.

The demodulator 51 is coupled to the communications channel through antenna 48. The plurality of despreaders 52 is coupled between the demodulator 51 and the plurality of FEC decoders and de-interleavers 56. The plurality of FEC decoders and de-interleavers 56 is coupled between the multiplicity of adders 53 and the multiplexer 57.

The demodulator 51 translates the code-division-multiplexed signal to a processing frequency. The plurality of despreaders 52 despreads the code-division-multiplexed signal into a plurality of despread channels, respectively. The plurality of despreaders 52 may be embodied, as is well-known in the art, as a plurality of matched filters or a plurality of correlators.

The multiplicity of FEC decoder and de-interleavers 56 generates a syndrome signal from an error rate of the multiplicity of added channels, and FEC decodes and de interleaves the multiplicity of added channels, as a multiplicity of decoded channels. The multiplexer 57 multiplexes the multiplicity of decoded channels and generates an estimate of the input data.

The prior art spread-spectrum transmitter and receiver, as shown in FIGS. 2 and 3, use parallel chip-sequence signals. The data to be transmitted are first de-multiplexed by a demultiplexer 31 to produce a plurality of uncorrelated data channels. Each uncorrelated data channel has at a lower data rate than the original data rate of data entering the demultiplexer 31. For example, if the incoming data rate were 16 megabits per second (Mbps), and the incoming data were de-multiplexed to 16 data channels, with each data channel at one Mbps.

The plurality of data channels is forward error correction (FEC) encoded and interleaved by a plurality of FEC encoders and interleavers 32, respectively, to generate a plurality of FEC encoded and interleaved data channels. FEC encoders and interleavers are well-known to the ordinary skilled artisan, and found in many technical journal articles and textbooks.

A plurality of spreaders 33 spread-spectrum processes the plurality of FEC encoded and interleaved data channels, as a plurality of spread-spectrum channels. A spreader typically is a product device for multiplying a data-sequence signal by a chip-sequence signal. A de-spreader equivalently may be realized from a matched filer or SAW device, as is well-known in that art.

In FIG. 2, the plurality of spreaders 33 includes a chip-sequence generator 34 for generating a plurality of chip-sequence signals and a plurality of product devices 35. In a preferred embodiment, the plurality of chip-sequence signals is a plurality of orthogonal chip-sequence signals, although a plurality of quasi-orthogonal chip-signal sequence signals also could be used. By quasi-orthogonal chip-sequence signals is meant chip-sequence signals which are nearly orthogonal or which are not orthogonal but have orthogonal type qualities.

The plurality of product devices 35 is coupled to the chip-sequence generator 34, and to the plurality of encoders and interleavers 32, respectively. The plurality of product devices spread-spectrum processes the plurality of FEC encoded and interleaved data channels, as a plurality of spread-spectrum channels. A product device my be embodied as an AND gate, or equivalently from one or more combinations of AND gates, NAND gates, NOR gates, gates or EXCLUSIVE-OR (XOR) gates. An alternative for the plurality of spreaders 33 is a plurality of matched filters or a plurality of surface acoustic wave devices, each having an impulse response matched to one of the chip-sequence signals in the plurality of chip-sequence signals.

The outputs of the plurality of spreaders 33 are combined by a combiner 36 and sent to the modulator 37 and transmitted over a communications channel. The combiner 36 preferably linearly combines the plurality of spread-spectrum channels, as a code-division-multiplexed signal having a multiplicity of channels. The combiner 36 alternatively may non-linearly combine the plurality of spread-spectrum channels, in some applications. The multiplicity of channels is defined by a respective chip-sequence signal, used for a spread-spectrum channel in the plurality of spread-spectrum channels, as is well-known in the art. The spreaders can operate at a chip rate depending on the desired processing gain.

In the spread-spectrum receiver, the process is reversed. Initially, a received code-division-multiplexed signal is amplified, filtered and shifted to baseband frequence by a demodulator 51. The received code-division-multiplexed signal is then despread by a plurality of de-spreaders 52. The plurality of despreaders 52 may be embodied as a plurality of correlators or a plurality of matched filters. A plurality of surface acoustic wave (SAW) devices alternatively may be used. The outputs of the plurality of de-spreaders are decoded and de-interleaved by a plurality of FEC decoders and de-interleavers 56, to produce a plurality of sub-channels of data. The plurality of sub-channels of data is multiplexed by a multiplexer 57 to generate a replica of the input data.

Figure 4:
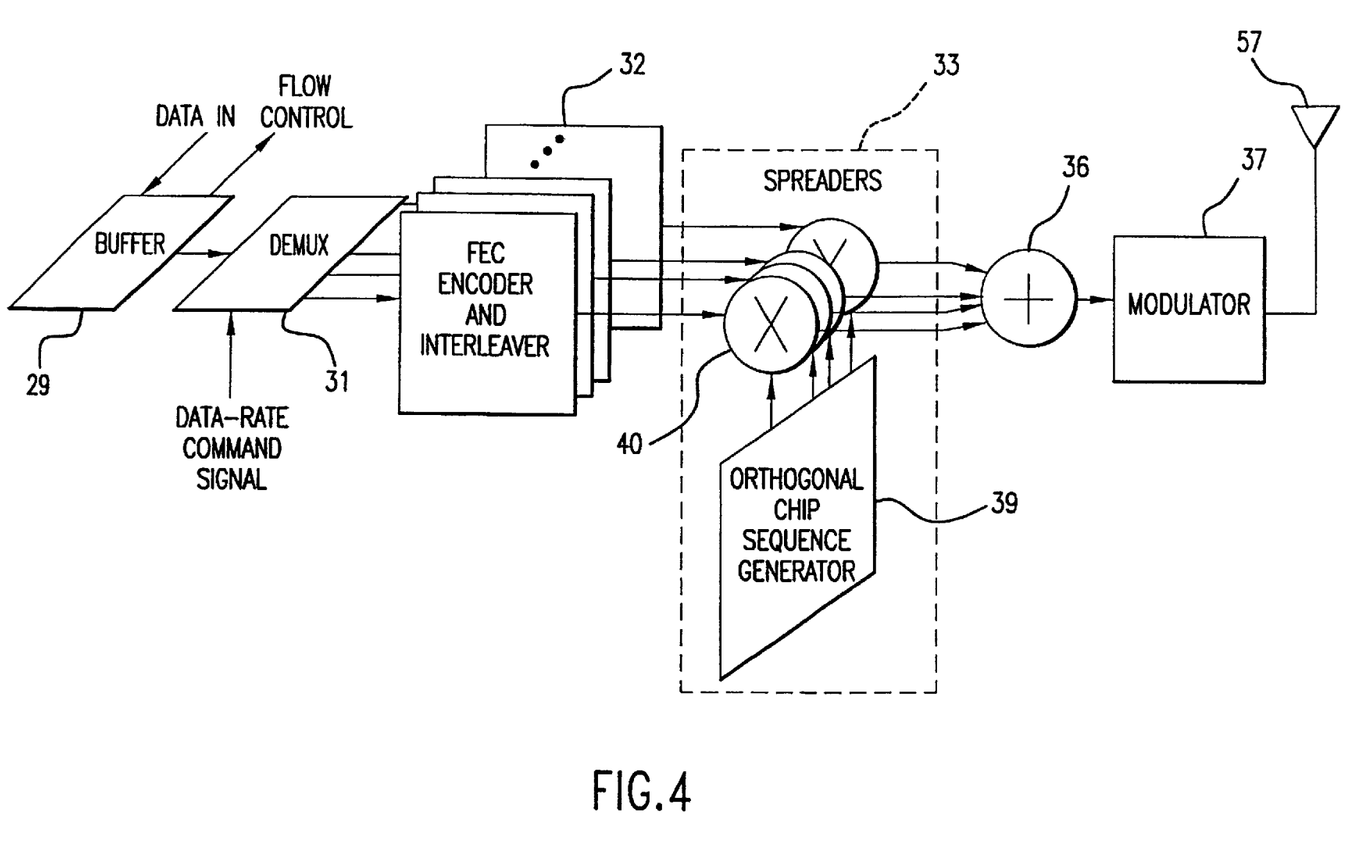
FIG. 4 is a block diagram of a spread-spectrum transmitter having a data buffer, and a demultiplexer controlled by a data-rate command signal, and using parallel channels.

The modification to FIG. 2, shown in FIG. 4, includes having a data-rate command signal control the demultiplexer 31. Input data to the demultiplexer 31, initially may pass through a buffer 29. The data-rate command signal controls the data rate of data from the demultiplexer 31. More particularly, the data-rate command signal determines the number of data channels having identical data and different data, in the plurality of data channels from demultiplexer 31.

Figure 5:
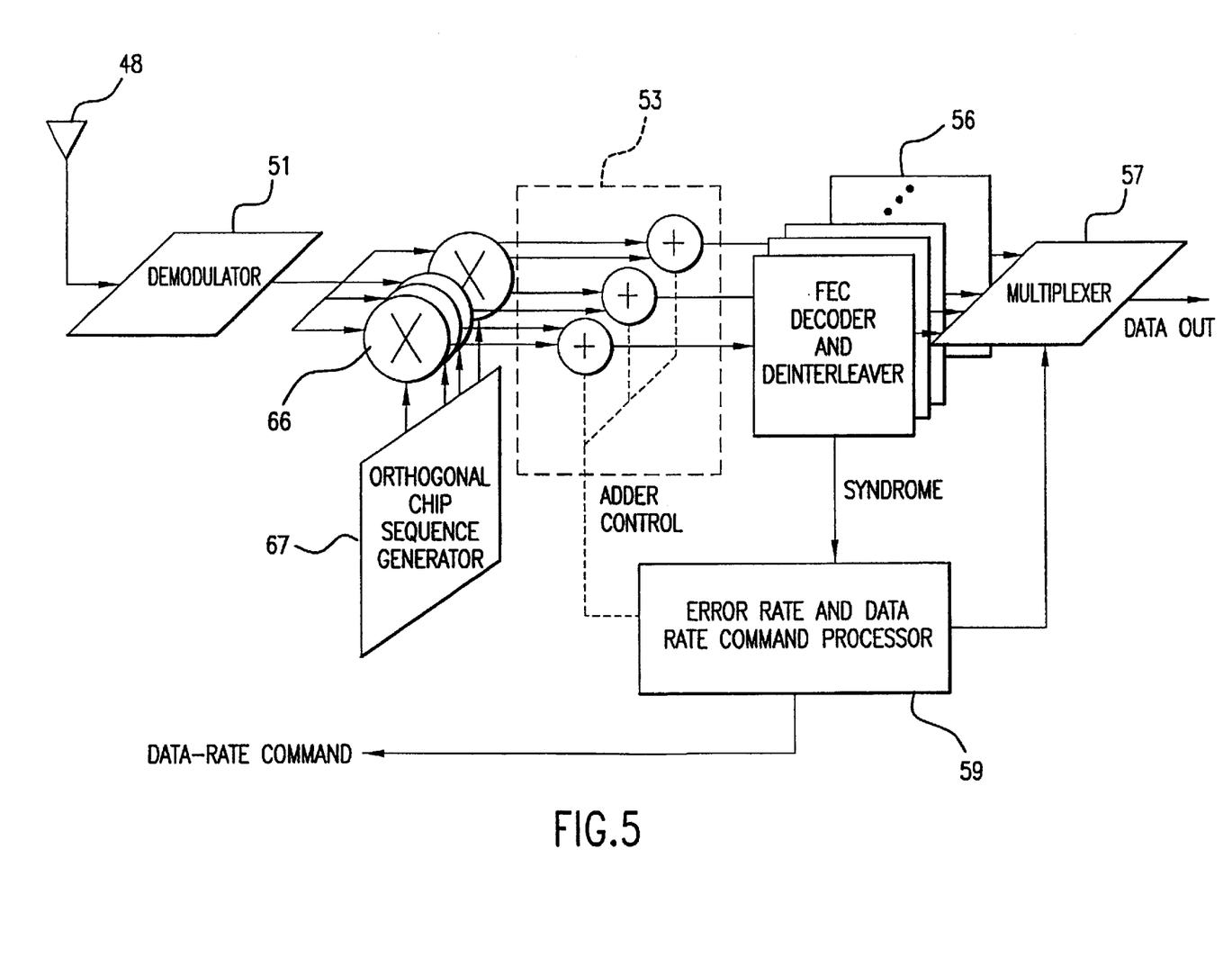
FIG. 5 is a block diagram of a spread-spectrum receiver for receiving parallel channels, with an error rate and a data rate command processor.

In the exemplary arrangement shown in FIG. 5, the command means, embodied as a command processor 59, and adder means embodied as a multiplicity of adders 53, is added to the embodiment shown in FIG. 3. The multiplicity of adders 53 is coupled between the plurality of despreaders 52 and the plurality of FEC decoders and de-interleavers 56, respectively. The command processor 59 is coupled to the plurality of FEC decoders and de-interleavers 56, the multiplexer 57, and the multiplicity of adders 53. The command processor 59 has a communications link to the spread-spectrum traqnsmitter, for sending the data-rate command signal to the spread-spectrum transmitter.

The multiplicity of FEC decoders generates a syndrome signal from an error rate of the multiplicity of added channels. In response to the syndrome signal, the command processor 59 determines a desired-data rate, and generates a data-rate command signal having the desired data rate. The command processor 59 also generates the adder-control signal, used by the multiplicity of adders 53, for adding together a number of despread channels of the plurality of despread channels. The command processor 59 generates a multiplexer signal having a number of decoded channels to multiplex together. The multiplexer 57, in response to the multiplexer signal, sets the number of the multiplicity of decoded channels to be multiplexed. The multiplexer 57 multiplexes the multiplicity of decoded channels and generates an estimate of the input data.

As illustratively shown in FIG. 4, the input data rate to the transmitter is reduced by a data-rate command signal, which is transmitted from the spread-spectrum receiver. The data rate can be reduced by any factor of the width of the demultiplexer 31. For example, if 16 parallel chip-sequence signals were used, then the input data rate can be reduced by a factor between 2 and 16. In a system, a buffer 29 and flow control may be required. The demultiplexer 31 then outputs identical bits to multiple lines that are fed to the encoders and interleavers 32. For example, the data rate command may be to reduce the data rate by a factor of 2. If 16 parallel chip-sequence signals were used, two spreaders would be devoted to each bit; that is, the transmitted power for each bit would be twice the power than in the maximum data rate situation.

In the exemplary arrangement shown in FIG. 5, the remote receiver further includes command processor 59. The error-rate and data rate command processor 59 reads or is fed the syndrome from the plurality of FEC decoders and de-interleavers 56. In response to the syndrome, the command processor 59 determines a data rate. Thus, the data rate is dependent on the error rate of data being received and decoded by the plurality of FEC decoders. The command processor 59, based on the data rate determined by the command processor 59, generates the data-rate command signal, the adder-control signal, and the multiplexer-control signal. The command processor 59 generates the data-rate command signal shown in FIG. 4.

The receiver shown in FIG. 5 is configured, by way of example, for a data rate reduction by a factor of two. The outputs of every two matched filters are added together before the data sub-streams are decoded and de-interleaved. The add-control signal is generated by the command processor 59. The multiplexer 57 then selects only half the decoder outputs, i.e., half of the plurality of decoded channels, to combine to form the output data. By way example, the syndrome of the FEC decoder is used to measure the error rate. The error rate information is used to generate the data rate command, which is transmitted to the base station transmitter. The error rate processor also controls the multiplexer 57 and the adders 53 as it determines how many of the outputs from the plurality of despreaders 52 should be combined for the reduced error rate.

Figure 6:
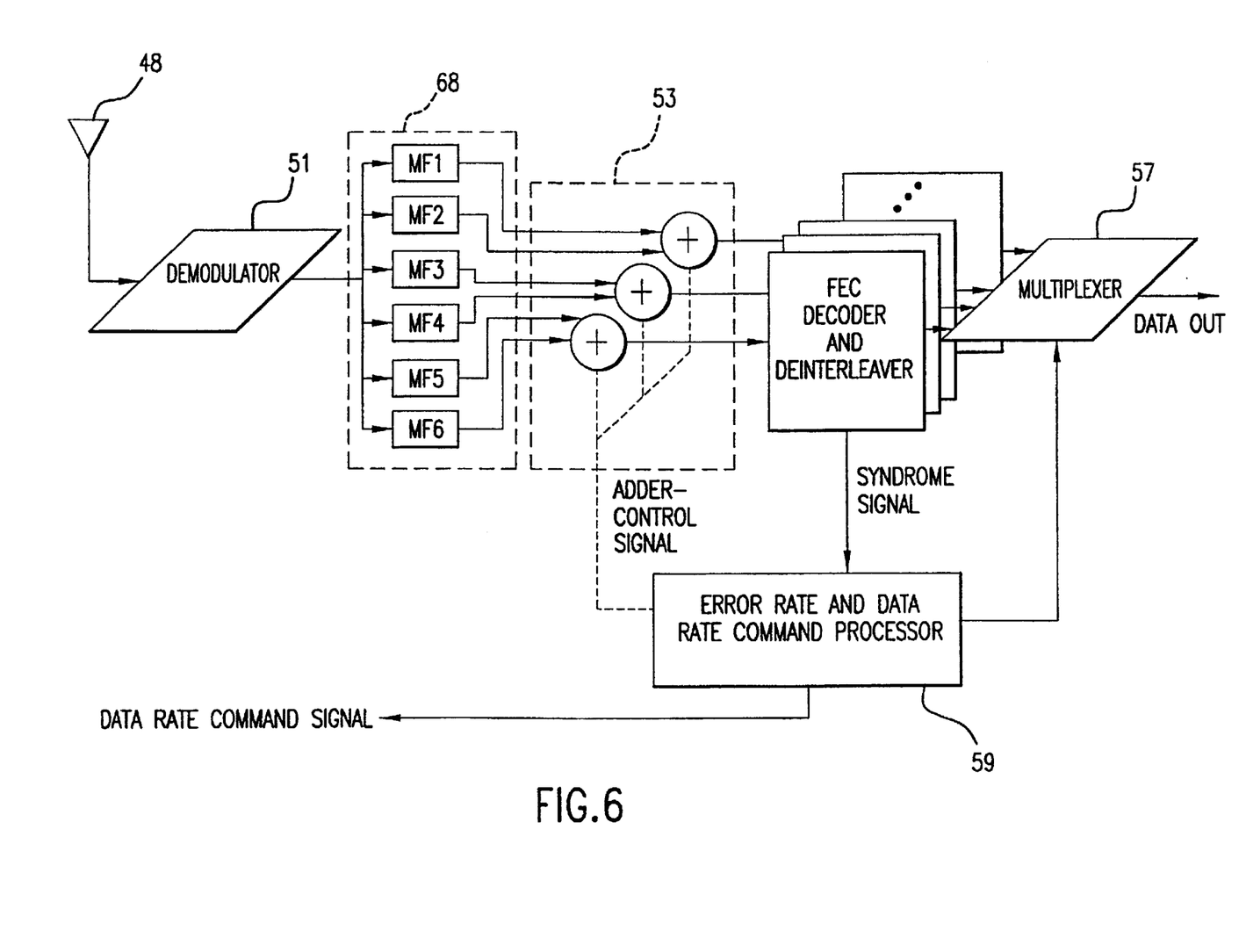
FIG. 6 is a block diagram of a spread-spectrum receiver for receiving parallel channels, using matched filter or SAW technology, with an error rate and a data rate command processor.

FIG. 6 shows the despreaders 52 alternatively embodied as a plurality of matched filters 67. Equivalently, the plurality of despreaders may be embodied as a plurality of SAW devices, which mathematically are equivalent to a plurality of matched filters 67.

Figure 7:
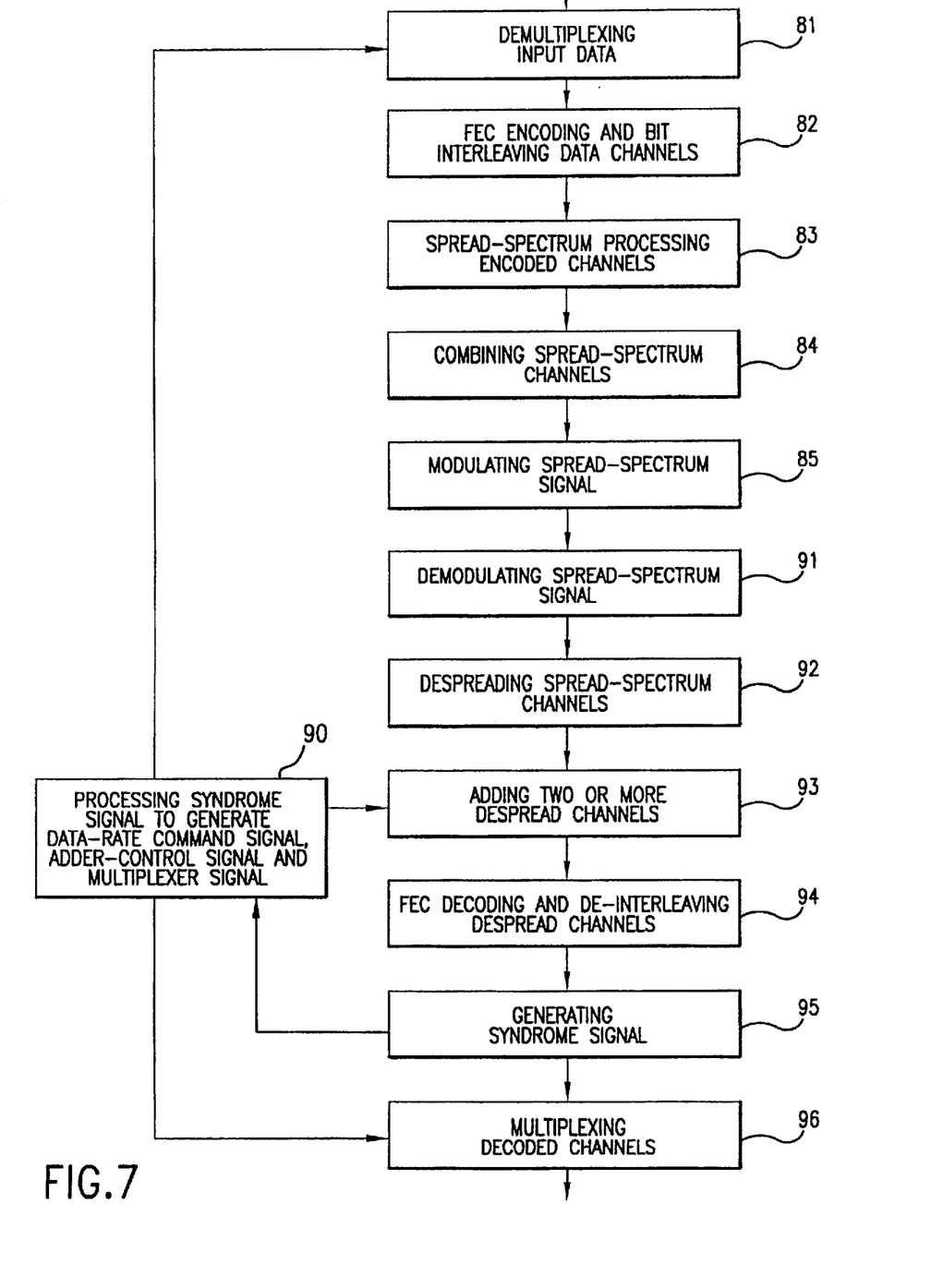
FIG. 7 is a flowchart of controlling data rate of a spread-spectrum transmitter, based on error rate at a spread-spectrum receiver.

As illustratively shown in FIG. 7, the present invention also includes a spread-spectrum method for controlling the data rate at a spread-spectrum transmitter. The method includes the steps of demultiplexing 81, in response to a data-rate command signal, input data into a plurality of data channels. The number of data channels in the plurality of data channels is determined from the data rate command signal.

The method includes FEC encoding and interleaving 82 the plurality of data channels as a plurality of FEC encoded and interleaved channels, respectively; and spread-spectrum processing 83 the plurality of FEC encoded and interleaved channels as a plurality of spread-spectrum channels. The plurality of spread-spectrum channels preferably are embodied with a plurality of orthogonal or quasi-orthogonal chip-sequence signals.

The method further includes the steps of combining 84 the plurality of spread-spectrum channels as a code-division-multiplexed signal; and modulating 85 and transmitting the code-division-multiplexed signal, which has the plurality of spread-spectrum channels, over a communications channel.

At a spread-spectrum receiver, the method includes the steps of demodulating 85 or translating the code-division-multiplexed signal to a processing frequency; despreading 92 the code-division-multiplexed signal into a plurality of despread channels, respectively; and adding 93, based on an adder-control signal, at least two despread channels to generate a multiplicity of added channels. The method includes generating 95 a syndrome signal from an error rate of the multiplicity of 20 µl added channels; FEC decoding and de-interleaving 94 the multiplicity of added channels, and a multiplicity of decoded channels; and, determining 90, in response to the syndrome signal, a desired-data rate. The method further includes generating 90 a data-rate command signal having the desired data rate; generating, in response to the syndrome signal, the adder-control signal for adding together a number of despread channels of the plurality of despread channels; generating 90, in response to the syndrome signal, a multiplexer signal having a number of decoded channels to multiplex together; and multiplexing 96 the multiplicity of decoded channels and an estimate of the input data. The data-rate command signal is sent over a communications channel to the spread-spectrum transmitter.

It will be apparent to those skilled in the art that various modifications can be made to the spread-spectrum communications, variable throughput reduction system and method of the instant invention without departing from the scope or spirit of the invention, and it is intended that the present invention cover modifications and variations of the spread-spectrum communications, variable throughput reduction system and method provided they come within the scope of the appended claims and their equivalents.

I claim:

1. A spread-spectrum system comprising:
    a demultiplexer for demultiplexing input data into a plurality of data channels;
    a plurality of forward-error-correction encoders and interleavers for FEC encoding and interleaving the plurality of data channels as a plurality of FEC encoded and interleaved channels, respectively;
    a plurality of spread-spectrum processors for spread-spectrum processing the plurality of FEC encoded and interleaved channels as a plurality of spread-spectrum channels, employing a plurality of chip-sequence signals;
    a combiner for combining the plurality of spread-spectrum channels as a code-division-multiplexed signal;
    a modulator for transmitting the code-division-multiplexed signal having the plurality of spread-spectrum channels, over a communications channel;
    a plurality of spread-spectrum despreaders for despreading the code-division-multiplexed signal into a plurality of despread channels, respectively;
    a multiplicity of adders, electronically controlled by an adder-control signal, for adding at least two despread channels to generate a multiplicity of added channels;
    a multiplicity of FEC decoder and de-interleavers for generating a syndrome signal from an error rate of the multiplicity of added channels, and for FEC decoding and de-interleaving the multiplicity of added channels, and a multiplicity of decoded channels;
    a command processor, responsive the syndrome signal, for determining a desired-data rate, for generating a data-rate command signal having the desired data rate, for generating the adder-control signal for adding together a number of despread channels of the plurality of despread channels, and for generating a multiplexer signal having a number of decoded channels to multiplex together; and
    a multiplexer for multiplexing the multiplicity of decoded channels and an estimate of the input data.

2. The spread-spectrum system as set forth in claim 1 further including a buffer, coupled before the demultiplexer, for storing input data prior to demultiplexing the input data.

3. The spread-spectrum system as set forth in claim 1, with said plurality of spreaders including:
    a chip-sequence generator for generating the plurality of orthogonal chip-sequence signals; and
    a plurality of product devices, coupled to said chip-sequence generator, for spread-spectrum processing the plurality of encoded channels as the plurality of spread-spectrum channels.

4. The spread-spectrum system as set forth in claim 1, with said plurality of spreaders including:
    a chip-sequence generator for generating the plurality of quasi-orthogonal chip-sequence signals; and
    a plurality of product devices, coupled to said chip-sequence generator, for spread-spectrum processing the plurality of encoded channels as the plurality of spread-spectrum channels.

5. The spread-spectrum system as set forth in claim 1, with said plurality of despreaders further including:
    a chip-sequence generator for generating a replica of the plurality of chip-sequence signals; and
    a plurality of product devices, coupled to said chip-sequence generator, for despreading the code-division-multiplexed signal as a plurality of despread channels.

6. The spread-spectrum system as set forth in claim 1, with said plurality of despreaders including a plurality a matched filters, having a plurality of impulse responses matched to the plurality of chip-sequence signals, respectively.

7. The spread-spectrum system as set forth in claim 1, with said plurality of despreaders including a plurality a surface acoustic wave (SAW) devices, having a plurality of impulse responses matched to the plurality of chip-sequence signals, respectively.

8. A spread-spectrum system comprising:
    demultiplexer means for demultiplexing input data into a plurality of data channels;
    encoder means for FEC encoding and interleaving the plurality of data channels as a plurality of FEC encoded and interleaved channels, respectively;
    spreader means for spread-spectrum processing the plurality of FEC encoded and interleaved channels as a plurality of spread-spectrum channels, having a plurality of chip-sequence signals;
    combiner means for combining the plurality of spread-spectrum channels as a code-division-multiplexed signal;
    modulator means for transmitting the code-division-multiplexed signal having the plurality of spread-spectrum channels, over a communications channel;
    despreader means for despreading the code-division-multiplexed signal into a plurality of despread channels, respectively;
    adder means, electronically controlled by an adder-control signal, for adding at least two despread channels to generate a multiplicity of added channels;
    decoder means for generating a syndrome signal from an error rate of the multiplicity of added channels, and for FEC decoding and de-interleaving the multiplicity of added channels, and a multiplicity of decoded channels;
    command means, responsive the syndrome signal, for determining a desired-data rate, for generating a data-rate command signal having the desired data rate, for generating the adder-control signal for adding together a number of despread channels of the plurality of despread channels, and for generating a multiplexer signal having a number of decoded channels to multiplex together; and multiplexer means for multiplexing the multiplicity of decoded channels and an estimate of the input data.

9. The spread-spectrum system as set forth in claim 8 further including a buffer, coupled before said demultiplexer means, for storing input data prior to demultiplexing the input data.

10. The spread-spectrum system as set forth in claim 8, with said spreader means including:

a chip-sequence generator for generating the plurality of orthogonal chip-sequence signals; and a plurality of product devices, coupled to said chip-sequence generator, for spread-spectrum processing the plurality of encoded channels as the plurality of spread-spectrum channels.

11. The spread-spectrum system as set forth in claim 8, with said spreader means including:

a chip-sequence generator for generating the plurality of quasi-orthogonal chip-sequence signals; and a plurality of product devices, coupled to said chip-sequence generator, for spread-spectrum processing the plurality of encoded channels as the plurality of spread-spectrum channels.

12. The spread-spectrum system as set forth in claim 8, with said despreader means further including:

a chip-sequence generator for generating a replica of the plurality of chip-sequence signals; and a plurality of product devices, coupled to said chip-sequence generator, for despreading the code-division-multiplexed signal as a plurality of despread channels.

13. The spread-spectrum system as set forth in claim 8, with said despreader means including a plurality a matched filters, having a plurality of impulse responses matched to the plurality of chip-sequence signals, respectively.

14. The spread-spectrum system as set forth in claim 8, with said despreader means including a plurality a surface acoustic wave (SAW) devices, having a plurality of impulse responses matched to the plurality of chip-sequence signals.

15. A spread-spectrum method comprising the steps of:

demultiplexing input data into a plurality of data channels;

FEC encoding and interleaving the plurality of data channels as a plurality of EC encoded and interleaved channels, respectively;

spread-spectrum processing the plurality of FEC encoded and interleaved channels as a plurality of spread-spectrum channels, employing a plurality of chip-sequence signals;

combining the plurality of spread-spectrum channels as a code-division-multiplexed signal;

transmitting the code-division-multiplexed signal having the plurality of spread-spectrum channels, over a communications channel;

despreading the code-division-multiplexed signal into a plurality of despread channels, respectively;

adding at least two despread channels to generate a multiplicity of added channels;

generating a syndrome signal from an error rate of the multiplicity of added channels;

FEC decoding and de-interleaving the multiplicity of added channels, and a multiplicity of decoded channels;

determining, in response to the syndrome signal, a desired-data rate;

generating a data-rate command signal having the desired data rate;

generating, in response to the syndrome signal, the adder-control signal for adding together a number of despread channels of the plurality of despread channels;

generating, in response to the syndrome signal, a multiplexer signal having a number of decoded channels to multiplex together;

multiplexing the multiplicity of decoded channels and an estimate of the input data.

16. The spread-spectrum method as set forth in claim 15 further including, before the step of demultiplexing, the step of storing input data prior to demultiplexing the input data.

17. The spread-spectrum method as set forth in claim 15, with the step of spread-spectrum processing including the steps of:

generating the plurality of orthogonal chip-sequence signals; and spread-spectrum processing the plurality of encoded channels as the plurality of spread-spectrum channels.

18. The spread-spectrum method as set forth in claim 15, with the step of spread-spectrum processing including the steps of:

generating the plurality of quasi-orthogonal chip-sequence-signals; and spread-spectrum processing the plurality of encoded channels as the plurality of spread-spectrum channels.

19. The spread-spectrum method as set forth in claim 15, with the step of despreading further including the steps of:

generating a replica of the plurality of chip-sequence signals; and despreading the code-division-multiplexed signal as a plurality of despread channels.

20. The spread-spectrum method as set forth in claim 15, with the step of despreading including the step of filtering, with a plurality of impulse responses matched to the plurality of chip-sequence signals, respectively.

* * * * *